UNITED STATES PATENT OFFICE.

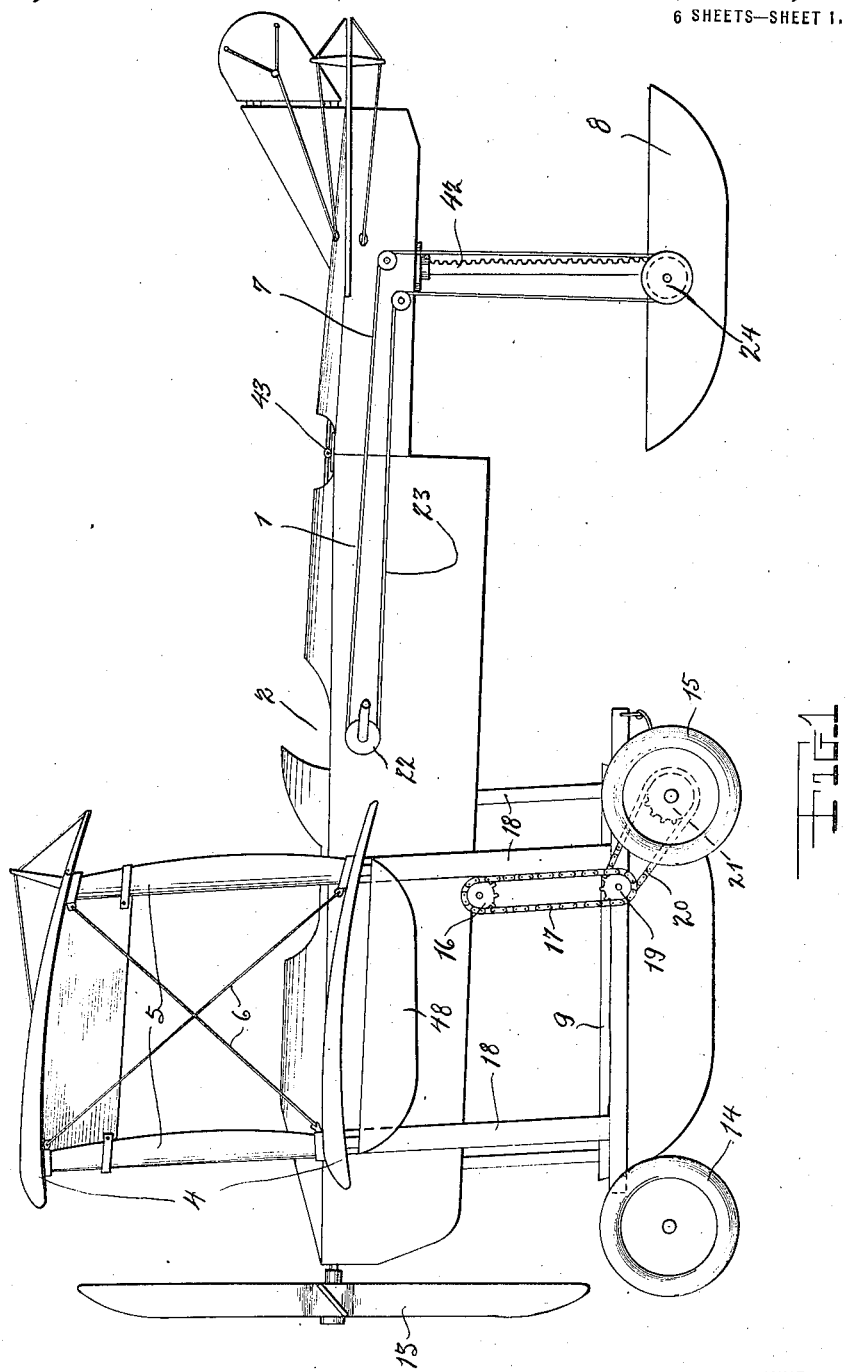

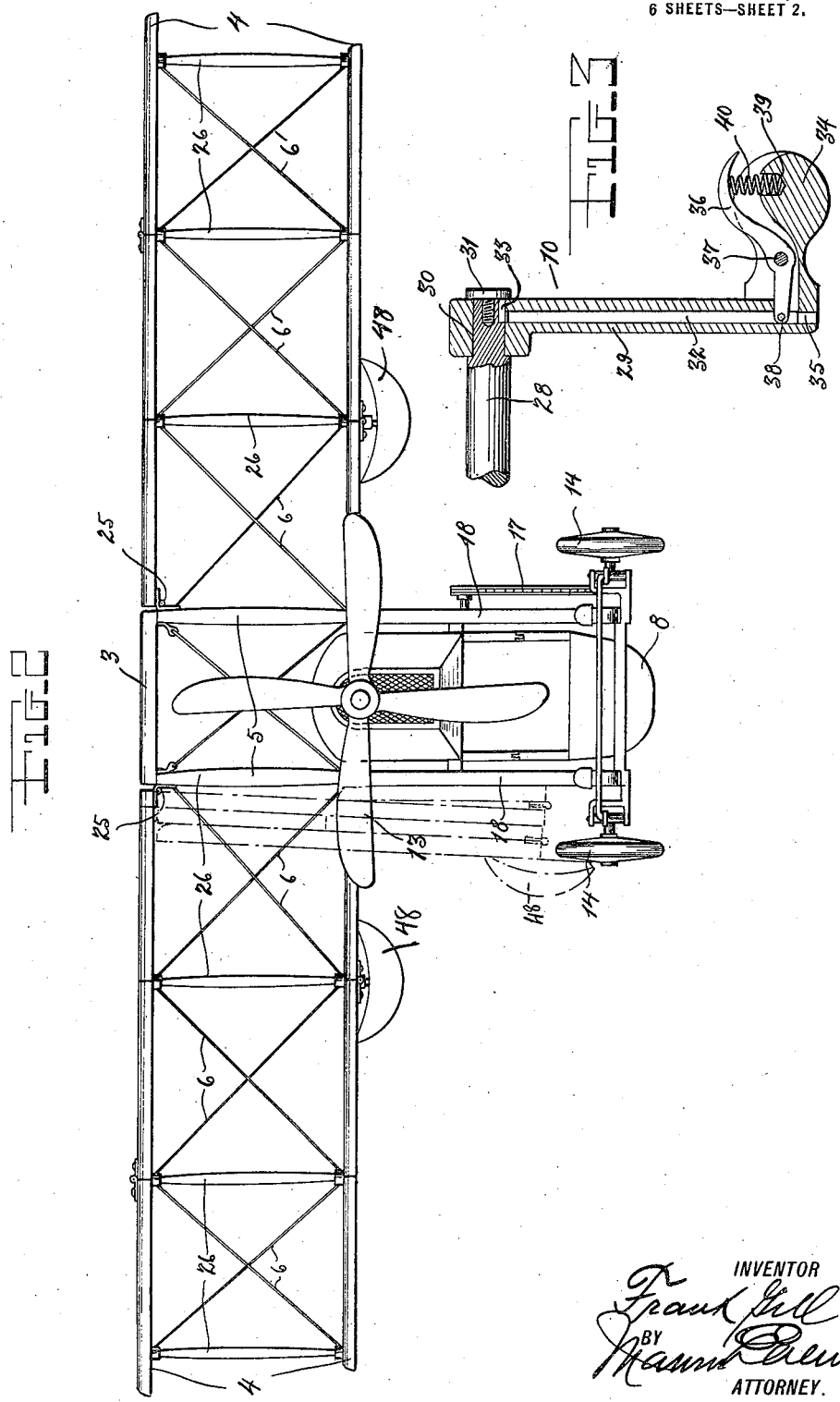

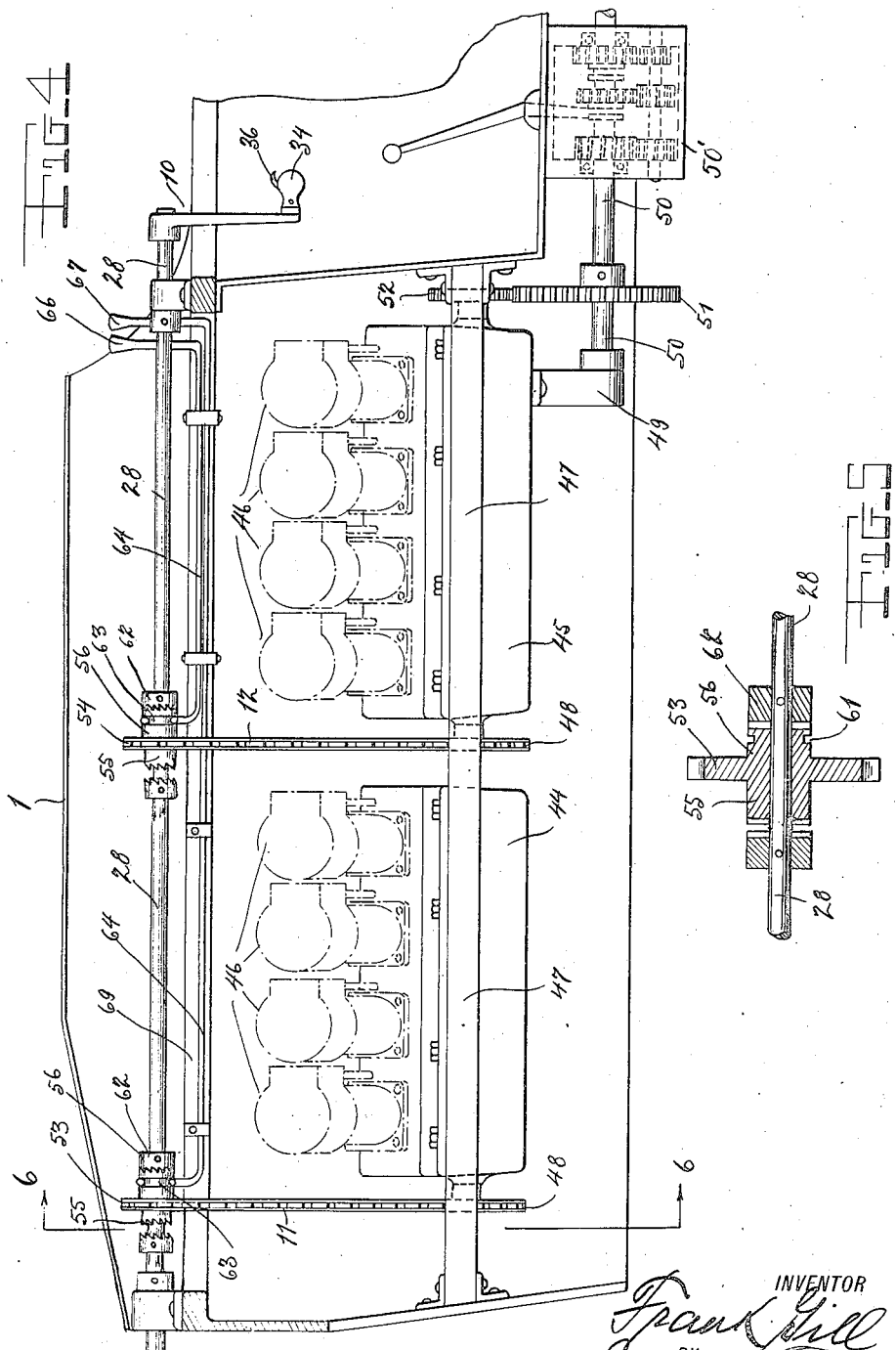

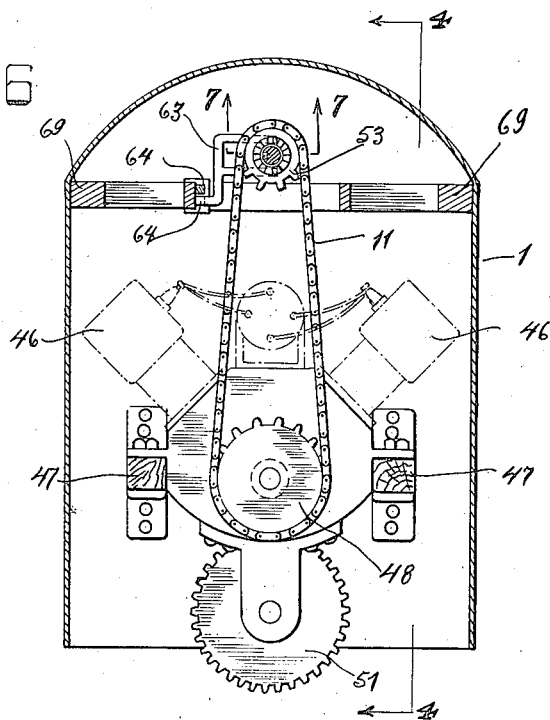
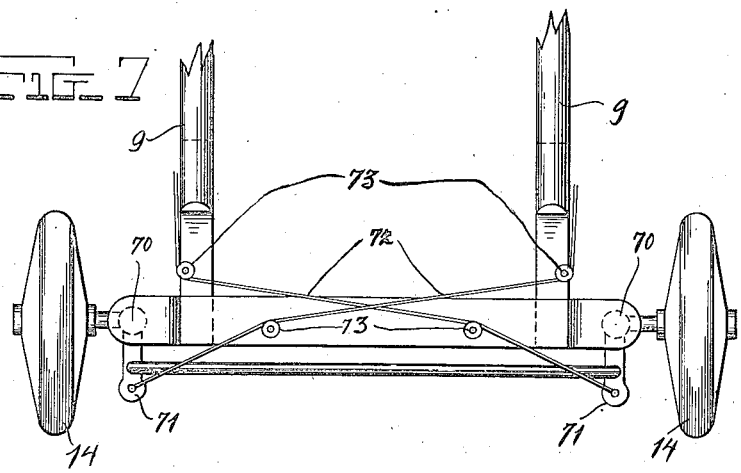

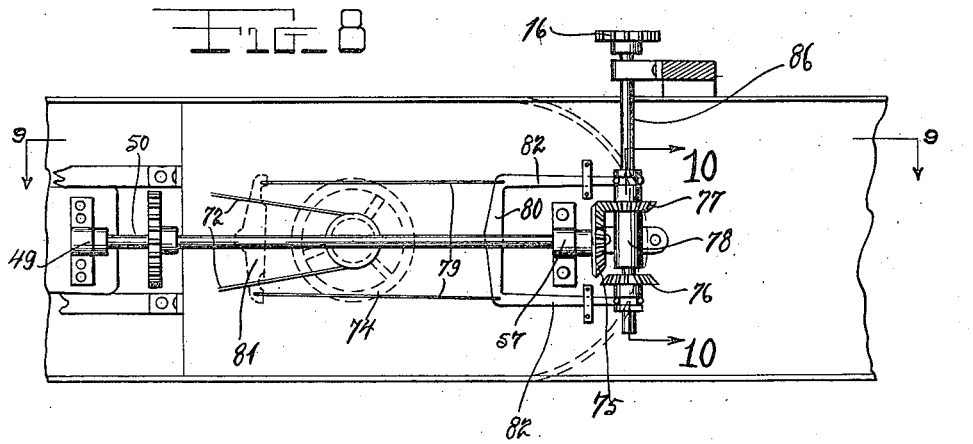
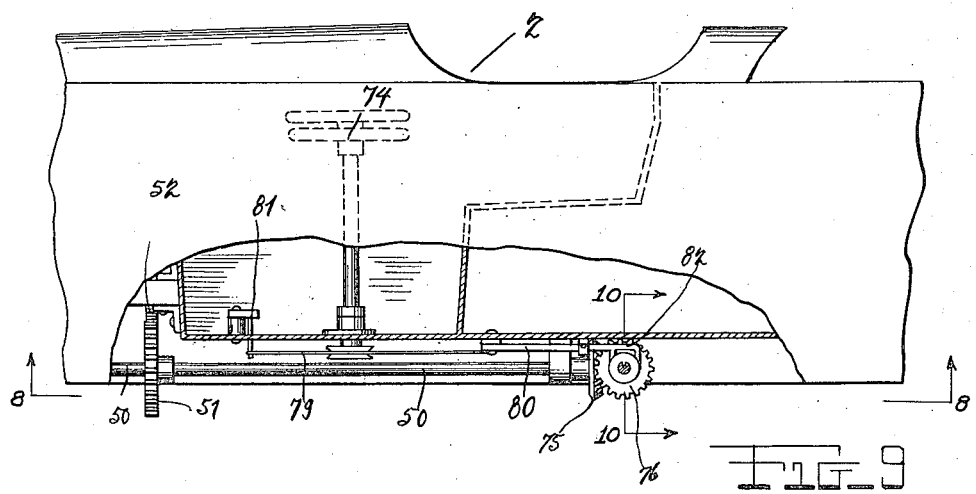
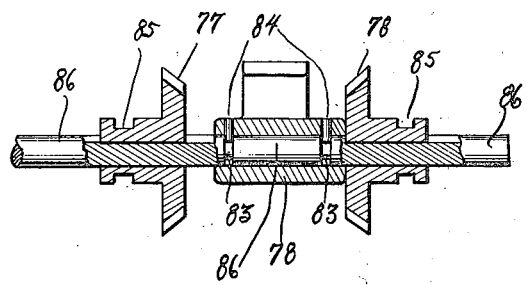

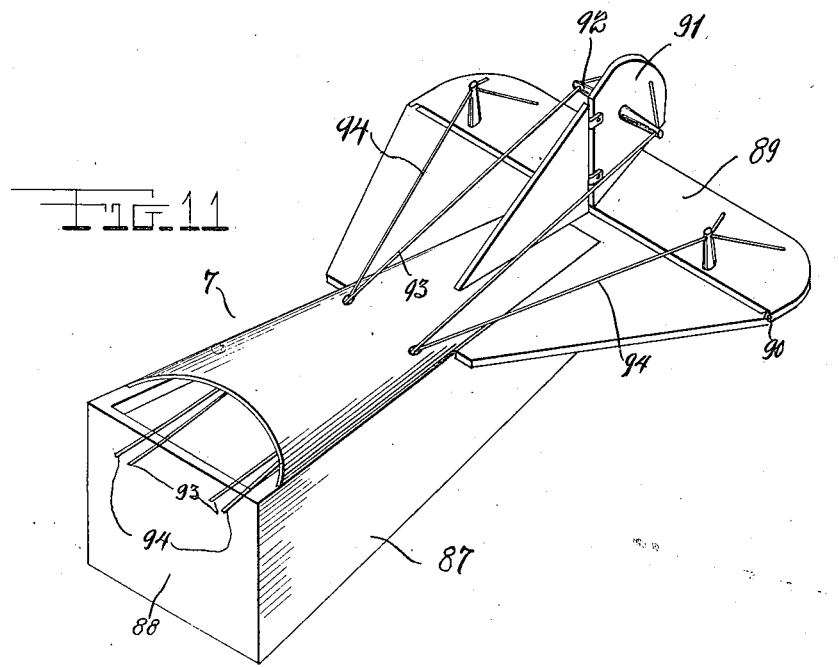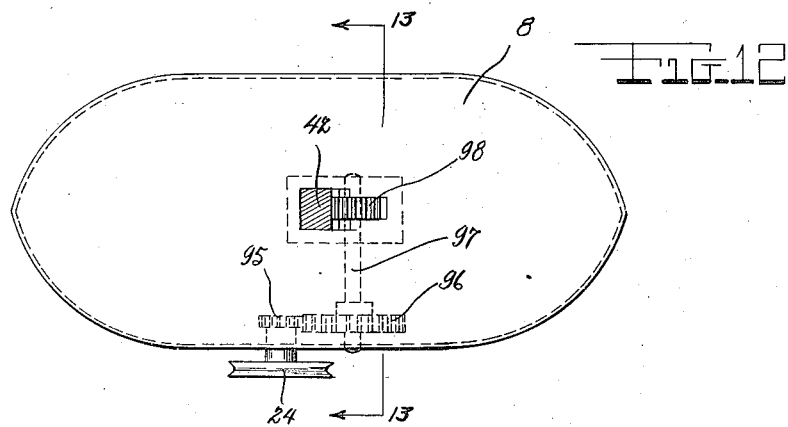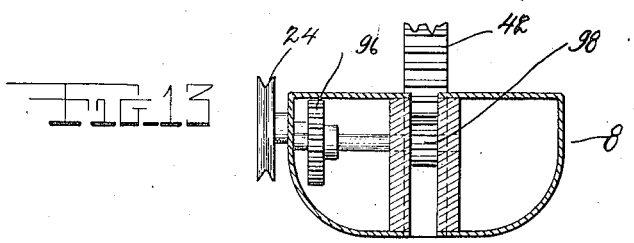

FRANK GILL, OF CHICAGO, ILLINOIS.

AIRSHIP.

1,405,407. Specification of Letters Patent. Patented Feb. 7, 1922.

Application filed June 30, 1920. Serial No. 392,938.

*To all whom it may concern:*

Be it known that I, FRANK GILL, citizen of Poland, and resident of Chicago, in the county of Cook and State of Illinois, have invented certain new and useful Improvements in Airships, of which the following is a specification.

This invention relates to airships, and has for its main object the provision of an airship adapted to locomotion both on the ground and on water as well as in the air.

Another object of the invention is to provide an airship of such simple and convenient arrangement and construction of parts, that its operation and manipulation may be accurately and quickly managed at all times.

The above and other objects will become apparent in the description below, in which characters of reference refer to like-named parts in the drawings, in which—

Fig. 1 is a side elevational view of my complete machine.

Fig. 2 is a front elevational view of the same.

Fig. 3 is a longitudinal central cross-sectional view of the crank handle 10, of Fig. 4.

Fig. 4 is an elevational view taken substantially on the line 4—4 of Fig. 6.

Fig. 5 is a cross-sectional view taken substantially on the line 7—7 of Fig. 6, the chain 11 being omitted.

Fig. 6 is a cross-sectional view taken substantially on the line 6—6 of Fig. 4.

Fig. 7 is a plan view of the forward part of the wheel truck 9, showing the dirigible wheels.

Fig. 8 is a view taken substantially on the line 8—8 of Fig. 9.

Fig. 9 is a view taken substantially on the line 9—9 of Fig. 8.

Fig. 10 is a view taken substantially on the line 10—10 of Fig. 9.

Fig. 11 is a perspective view of the tail of the machine.

Fig. 12 is a plan view of the buoyant member 8 of Fig. 1.

Fig. 13 is a view taken substantially on the line 13—13 of Fig. 12.

Referring now in detail to the drawings, the numeral 1 represents the main body of the airship, and 2 the entrance to the cockpit thereof containing the driver's seat. The main frame 3 rises above said body supported upon uprights 5. Upper and lower side wings or planes 4 are attached to the central frame 3 by elbows 25 which may be hinged so as to make the machine readily demountable. Wire binders are interlaced in the wings, shown at 6, to give rigidity to the whole. The tail is represented generally at 7, and is attached to the body by the elbow 43, which may also be hinged. An adjustable buoyant member 8 is attached to the tail 7 through the medium of a rack bar 42, the distance between said member and the tail being adjustable by means of a hand wheel 22 operating a flexible belt 23 in engagement with a pulley 24 on the said member, and further mechanism later to be described. The propeller is indicated at 13, and the wheel truck at 9, the latter connected to the body by uprights 18, and having dirigible front wheels 14 and rear wheels 15.

The rear wheels 15 are used to propel the machine along the ground, for which purpose a gear 21 is rigid to the rear wheel shaft, which is connected to the motor shaft of the machine by the chain 20, sprocket 19, chain 17, sprocket 16, and additional mechaism later to be described. Additional buoyant members 48 are attached under the planes 4. Spaced apart uprights 26 separate the upper wing 4 from the lower.

Within the body 1 are contained two motors 44 and 45, each of eight cylinders 46, each having a gear 48. Above said motors, on the frame 69, is the propeller shaft 28, to the inner end of which, within the cockpit, is attached a crank handle 10 for starting the engine. Said motors are supported upon beams 47 secured to the body 1. Sprockets 53 and 54 are slidably mounted on the shaft 28 and are connected by chains 11 and 12 to the gears 48. I have arranged the device so that either the motor 44, or that 45, may be used alone, or both may be used together, thus providing against the common accident of having a machine fall because its motor went wrong. For this purpose, referring to Fig. 5, the shaft 28 is provided, for each motor, with the slidable sprockets 53 and 54 above mentioned. A hub 55 extends to the left of said sprocket, and a slightly narrower hub extends to the right, the latter being provided with a peripheral groove 61 adapted to receive the fingers of the shifting member 63. The right-hand hub is provided with a circular rack, as is also the member 62 which is rigid to the shaft 28. By means of the shift 63 it is apparent that the hub 56 and the member 62 may be engaged or disengaged, in the manner of a clutch, the shift being operated by the rods 64. Thus, when it is desired to use the motor 44 alone, the lever 67 is moved so as to engage the hub 56 of the gear 53 with the member 62; if the motor 45 is to be used alone, the lever 67 is moved first to disengage the hub 56 of the gear 53 from the member 62, and then the lever 66 is moved to engage the hub 56 of the gear 54 with the member 62. Thus, also, both motors may be used at the same time.

To the rear motor 48 is connected a shaft 50 through the medium of a gear 51 on the shaft 50 and a small gear 52 on the crank shaft of the motor. A bearing support 49 suspends the shaft 50 from said motor. This shaft 50 is the driving source of the sprocket 16; since less power is necessary to drive the machine along the ground than in the air, but one of the motors is used for this purpose. Referring to Fig. 8, the shaft 50 is supported near its other end in a bearing 57, and is provided at the latter end with a bevel gear 75. A cross-shaft 86 is mounted at right angles to the shaft 50, at one end of which is the sprocket 16. The shaft 86 is longitudinally slidable, and is provided with a pair of bevel gears 76 and 77 spaced apart by a distance slightly in excess of diameter of the gear 75. A housing 78 surrounds the shaft 50 between said gears 76 and 77, and a fork 80 has one of its fingers 82 in engagement with each of the bevel gears 76 and 77. It is apparent that by swinging said fork in one direction the gears 76 and 75 will engage, and by swinging said fork in the other direction, the gears 77 and 75 will engage. Thus the machine may be driven along the ground in either forward or reverse direction. For operating said fork as just mentioned, I have provided a member 81 pivoted at its centre on the floor of the cock-pit, with cords or wires 79 leading to the fork 80. The member 81 is operated by the feet of the driver. The housing 78 is provided with oil holes 84 for oiling the bearing therein, and the shaft 86 is therein provided with peripheral grooves 83 in which oil rings may be inserted. The fingers 82 of the fork 80 engage the gears 76 and 77 about the grooves 85 in the hubs rigid to said gears, as shown in Fig. 10.

The wheels 14 are attached to the truck 9 by elbows 71 pivoted at their centres 70. At the forward ends of said elbows are attached cords 72 which pass inwardly about rollers 73, and thence back in the body 1 to the steering wheel 74.

The construction of the tail member 7 is detailed in Fig. 11, in which the horizontal fin 89 is pivoted at 90 to the body of the tail, and the vertical fin 91 is pivoted at 92. Cords 94 are attached to the fin 89, and cords 93 to the fin 91 for the purpose of manipulating the same; since this feature of the machine forms no part of my invention, I have not illustrated the levers to which said cords are attached.

The buoyant member 8 is detailed in Figs. 12 and 13, showing a shaft 97 having a gear 96 adjacent the side of the member and a sprocket 98 near the centre of the member 8. A sprocket 95 is rigid to the shaft upon which is mounted the pulleys 24, and the former is in mesh with the gear 96. The rack 42 passes vertically through the said member, and is in engagement with the sprocket 98. It is thus apparent that, as the wheel 24 is turned by turning of the hand wheel 22, the rack 42 is raised or lowered at will.

In Fig. 3 I have shown a detailed view of my crank handle, showing the same constructed of a shank 29 having a longitudinal channel therethrough for the passage of a rod 32 pivotally attached to a simple lever 36 at 38. A notch 33 is provided in the end of the shaft 28 adapted to receive the end of said rod 32, the end of said shaft being narrowed as at 30. A screw 31 retains the handle 10 in place on the shaft. The hand grip portion 34 is provided with a recess 39 containing a coiled compression spring 40 attached to the underside of the lever 36. Normally said spring retains said lever in raised position, thus withdrawing the rod 32 from engagement with the notch 33. However, as one grasps the handle 34, he simultaneously depresses the lever 36 and thus raises the rod 32 into engagement with the notch 33, whence the handle is in engagement with the shaft 28, and the shaft is turned by the handle for starting the motors.

Thus it is apparent that I have devised an airship which is adapted to locomotion through the air, on the ground, or over the surface of water, which is at the same time readily operable and controllable by the driver from his seat.

I claim:

1. In an airship, a buoyant body, having a plurality of motors therein, means for controlling the operation of either or all of said motors, pairs of wheels attached to said body, respectively at the front and rear, means for transmitting power from one of said motors to said rear wheels, a buoyant body disposed between said wheels, means for controlling the rotation of said rear wheels in either direction, dirigible means for said front wheels, a second buoyant body below the main body and means for raising and lowering the last named body.

2. In an airship, a wheeled body, means for buoying said body when the same is on the surface of water, additional buoying means situated under the tail of said airship, means for adjusting the distance between said additional buoying means and said tail said means consisting of a vertical rack rigid to said tail, a pinion mounted in said last-named buoying means, a pulley, a hand-wheel mounted on said body near the driver's seat for driving said pulley, and means for transmitting power from said hand wheel to said pulley.

Signed at New York, in the county of New York and State of New York, this 19th day of May, A. D. 1920.

FRANK GILL.